Patented June 24, 1969

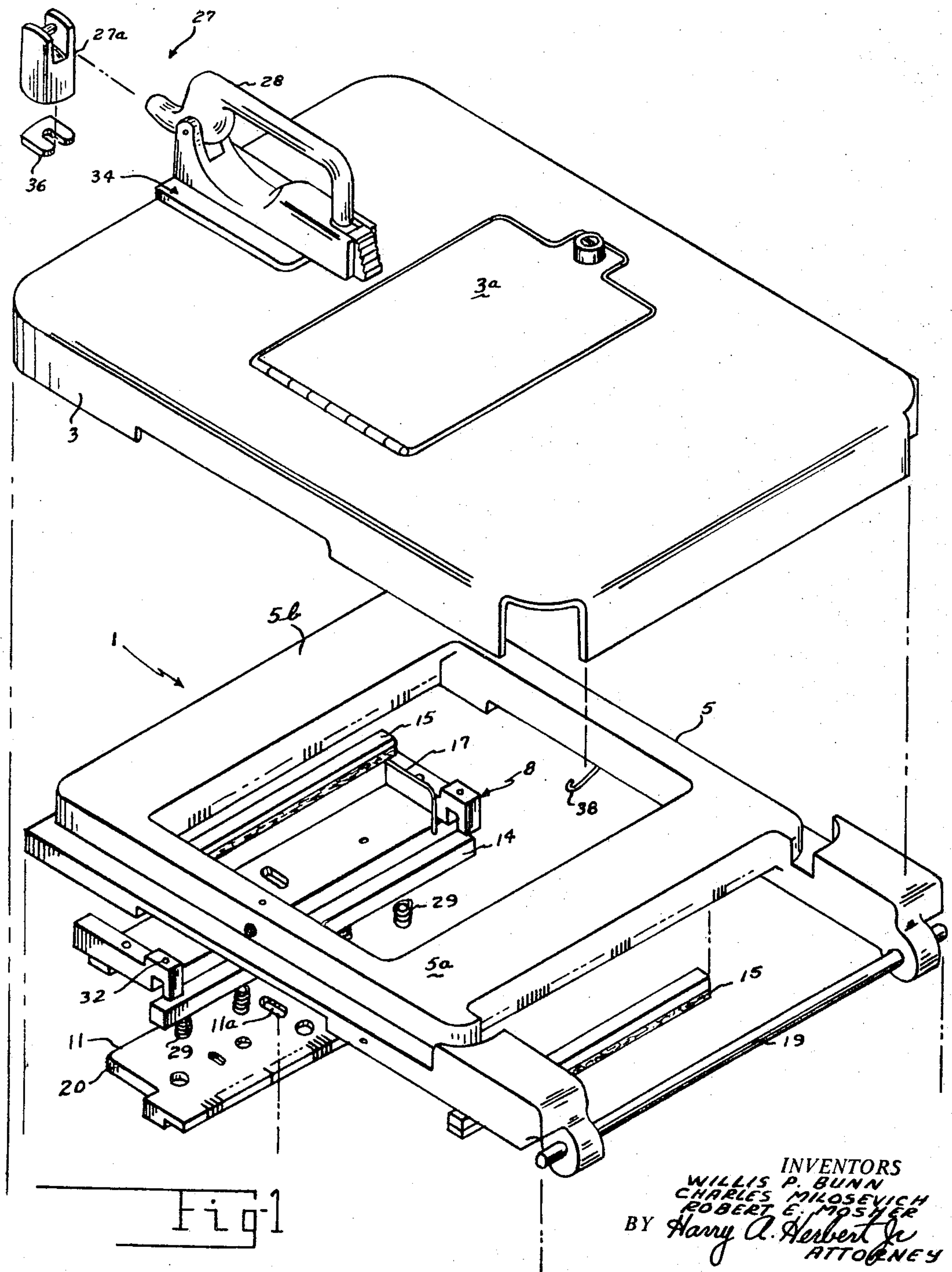
INVENTORS
WILLIS P. BUNN
CHARLES MILOSEVICH
ROBERT E. MOSHER
BY Harry A. Herbert Jr
ATTORNEY
Arthur R. Parker
AGENT INVENTORS
WILLIS P. BUNN
CHARLES MILOSEVICH
ROBERT E. MOSHER
BY Harry A. Herbert Jr
ATTORNEY
Arthur R. Parker
AGENT INVENTORS
WILLIS P. BUNN
CHARLES MILOSEVICH
ROBERT E. MOSHER
BY Harry A. Herbert Jr.
ATTORNEY
Arthur R. Parker
AGENT United States Patent Office 3,452,280

1

3,452,280
MODULE TEST FIXTURE HAVING MODULE-KEY SENSING AND TEST PROBE ELEMENTS

Willis P. Bunn, Garden Grove, Charles Milosevich, Yorba Linda, and Robert E. Mosher, San Clemente, Calif., assignors to the United States of America as represented by the Secretary of the Air Force Filed July 31, 1967, Ser. No. 657,746
Int. Cl. G01r *31/28*
U.S. Cl. 324—158 10 Claims

ABSTRACT OF THE DISCLOSURE

A printed circuit module to be tested is affixed to a lower test frame member hingedly mounted to a similar upper test frame member. Electrical contact springs are slidably positioned in each frame member and are moveable to a position in electrical contact with both slot and key positions on the printed circuit module. Electrical shorting bars are attached to each frame member and each incorporate an electrical contact edge in initial contact with the electrical contact springs. The electrical contact springs in engagement with the module slot and key positions, when the selected module is to be tested, are respectively sensed or identified by movement of the corresponding contact springs to an engaged, shorting-out position with the electrical contact edge, or to a raised, non-engaged and non-shorting position relative thereto.

*Background of the invention*

This invention relates generally to the field of electronic modules and, in particular, to improved means for checking out the module circuits and connections for failure and/or malfunction. More specifically, the test fixture of the present invention provides a common interface between printed circuit module assemblies of various configurations and a common functional test console.

In previous module test arrangements, the above noted interface was accomplished, for example, either by utilizing conventional bellows type connectors that slip over the module printed contacts, or alternatively, if a module was to be equipped with permanently affixed connectors, the interface would be the mating connector half itself. Moreover, because all printed circuit modules are keyed to prevent accidental electrical damage, a separate connector for each key combination would usually have to be provided on the test console. However, as an alternate method, an adapter for each type to be tested has been provided in previous module test systems. Such methods are quite costly, and require a new adapter for each new module involving, of course, a considerable excess of electrical wiring, and/or a redesign of the test console itself. In this connection, it is noted that, while such connectors are designed to function satisfactorily for five hundred insertions and withdrawal cycles, the service life for a module checkout console may be as much as 10,000 cycles or longer. This would necessitate the relatively frequent change of worn out connectors and, therefore, make servicing of the console rather expensive. Furthermore, as a result of the excessive amount of wire required in previous systems to connect parallel wired connectors and/or adapters, electrical problems in critical circuits are emphasized. Finally, because of the high contact density inherent in such previously designed connectors, the insertion and withdrawal forces are relatively high and may be on the order of 40 pounds or greater. In addition to requiring separate insertion and withdrawal tools, such relatively high loads are apt to cause a high incidence of failure. Therefore, the present module test fixture to be described hereinafter in detail was developed to provide

2 a device that drastically reduces the frequency of change of worn out connectors, eliminates the need for a new adapter each time a new module is introduced, and substantially reduces the amount of wire required to connect the connectors or adapters in previously developed electronic module checkout systems.

*Summary of the invention*

The principal object of the present invention is, therefore, to provide an improved module test fixture adapted to act as an interface capable of accepting and testing a variety of electronic modules having various differences in configuration.

A still further object of the invention is in the development of a simplified module test fixture able to test a plurality of modules exhibiting a variety of interface configurations without the need for special insertion or withdrawal tools.

Another object of the invention resides in the provision of a new and unique electronic module test mechanism which is competent to test many different modules and to act as interface with a common functional test console without requiring special adapters for each different module configuration.

Other objects and advantages of the present invention will become apparent in view of the following description considered in connection with the accompanying drawings in which:

*Description of the drawings*

FIGURES 1 and 1*a* represent a single exploded perspective view of the overall module test fixture of the present invention, illustrating details of the improved upper and lower half test assemblies utilized therewith, and the novel supporting means for the printed circuit module to be tested therein.

*Description of the preferred embodiment*

Figure 1A:
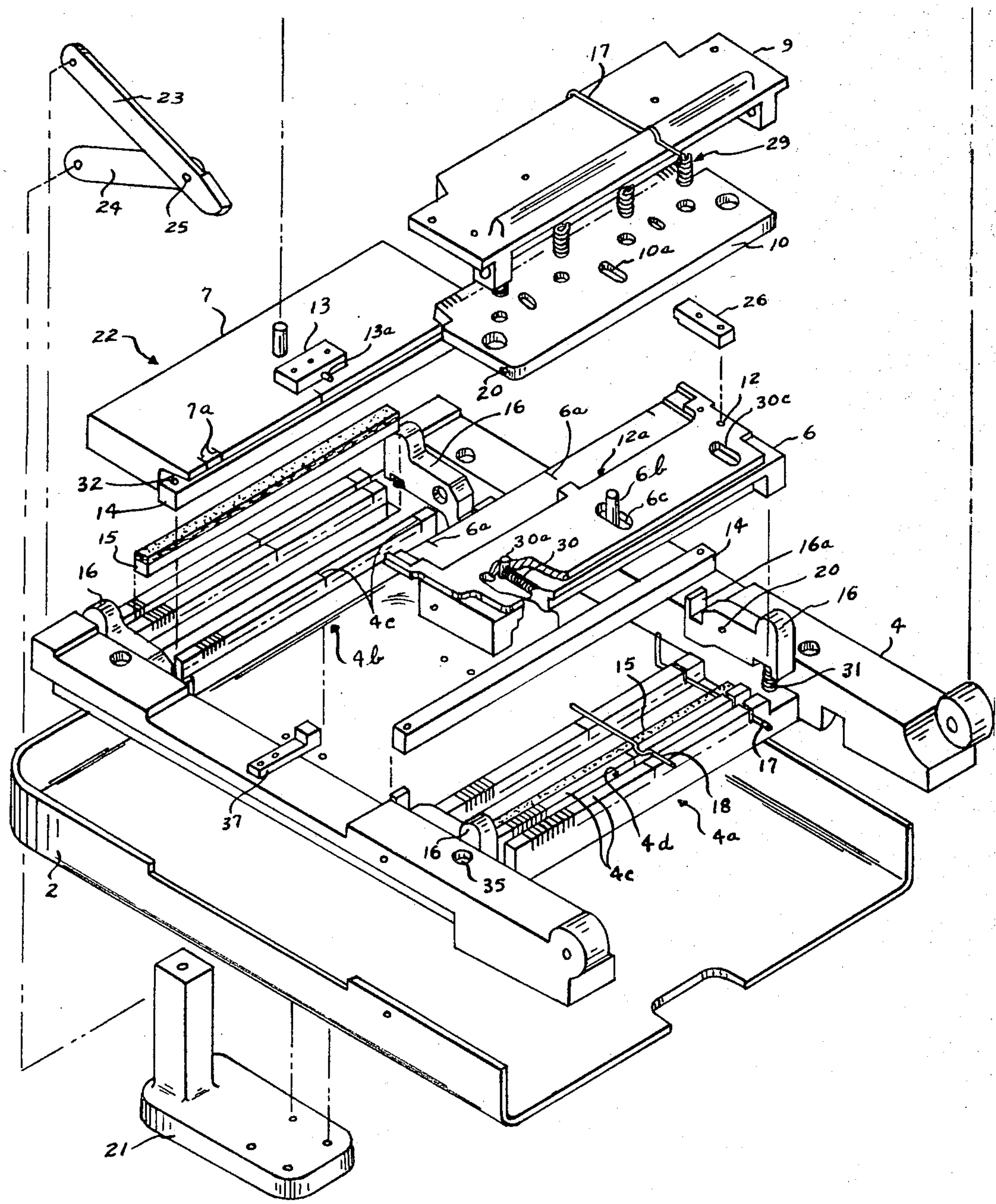

Referring to the drawings, and in particular, to the combined view of FIGURES 1 and 1*a* thereof, the module test fixture of the present invention is shown as consisting of a pair of similarly constructed upper and lower half assemblies indicated respectively at 1 and 22 as hinged to each other by means of the hinge pin 19. To protect the inner workings of both assemblies, the test fixture incorporates a top cover at 3 and a bottom cover at 2, which covers may be fabricated from any suitable metal or plastic material and latched together by the latch mechanism indicated generally at 27. Upper and lower half assemblies 1 and 22 each incorporate a substantially open frame indicated respectively at 5 and 4. Frames 4, 5 are almost identical in construction and each incorporates a pair of oppositely-disposed intermediate or transversely-extending supporting members indicated respectively at 4*a* and 4*b*, and 5*a* and 5*b*. Members 4*a*, 4*b* and 5*a*, 5*b* each incorporates a raised or upstanding inner surface divided into a plurality of alternate transverse supports and grooves, as for example, those indicated respectively at 4*c* and 4*d* for supporting member 4*a*. Said upstanding transverse supports are slotted as shown for example at 4*e* in supporting member 4*b* in which slots are located the electrical contact springs indicated for example at 17, 18 in supporting member 4*a*. These contact springs bear on the resilient pressure bars at 15, which may be made adjustable in any suitable manner so that the contact pressure may be varied as desired. Electrical contact springs 17, 18 are held in place within the slots provided therefor as shown by means of the insulated metal retainer plates indicated at 6, 7, 8 and 9, which retainer plates may be fastened to the main frames 4, 5, respectively, with suitable hardware. Lower frame retainer plates 6, 7 are slotted in their forward edges, as shown for example at **6*a* and 7*a*, respectively, to provide guides for the tips of the electrical contact springs 17 and 18. Lower frame 4 is further provided with a plurality of metal cams at 16 pivoted to the frame side members as at 20 and each incorporates a slot at 16*a* in which are adjustably affixed as at 32, the insulated metal shorting bars 14**. The latter incorporates an electrical contact along one edge thereof and are used to indicate keyway positions in both connector and printed circuit ends of the printed circuit board to be tested by the module test fixture of the present invention.

In the lower half of the inventive module test fixture, the previously-noted shorting bars 14 are used, in conjunction with the cams 16 to raise and lower the electrical contact springs 17, 18 to one or the other of two positions of adjustment in the slots provided therefor. In this connection, when the module test fixture is in its open position, cams 16, which are attached to the frame 4 by means of the compression springs 31, are spring-urged to pivot to their raised or opened position about the pivot at 20 to thereby move lower frame shorting bars 14 affixed thereto downwardly to retract or withdraw lower frame electrical contact springs 17, 18 below the surface of the previously noted retainer plates 6 and 7. When the present module test fixture is closed, the cams 16 are then forced against the action of compression springs 31 to pivot in the opposite or downward direction to their closed position to thereby move shorting bars 14 in an upward direction in contact with metal retainer plates 6, 7 and thus allow contact springs 17 and 18 to again make contact with the printed circuit board under test. In this regard, the module board to be tested is located or positioned within the test fixture in supporting relation on the lower frame retainer plates 6 and 7 and between the metal guide plate indicated at 12 and the insulated metal guide block indicated at 13. Guide block 13 is provided with a small metal pin **13*a* which is adapted to engage or index with a tooling hole provided in the connector end of the printed circuit board under test. Utilization of such a pin and tooling hole arrangement provides the close registration required between the electrical contact springs 17**, for example, and the connector end of the printed circuit board.

The previously mentioned metal guide plate 12 is supported on the top surface of retainer plate 6 by means of the relatively enlarged pin and slot arrangement indicated respectively at **6*b* and 6*c*. Furthermore, the printed circuit board under test is further retained on the aforesaid guide plate 12 by means of the support 26 and the guide plate 12 is configured as shown at 12*a* with a surface adapted to provide appropriate support for and accommodate the printed circuit end of the module under test. In addition, compression springs, one of which is shown at 30 in the partially broken away sectional view of retainer plate 6, provides constant pressure to guide plate 12 to thereby hold the module board under test in engagement with the guide pin 13*a* of guide block 13. Each spring 30 is seen to be affixed to the retainer plate 6 at one end and attached to the spring guide pin 30*a* at the other end. Spring guide pin 30*a* is mounted for movement in a slot, indicated at 30*c*, for example, incorporated in guide plate 12 to permit it to apply the previously mentioned constant pressure thereto and, in this manner, ensure registration between the module connector end and the guide pin 13*a* mounted on retainer plate 7**.

Upper half assembly 1 incorporates the previously mentioned insulated metal retainer plates 8 and 9 which are utilized to hold similar upper frame electrical contact springs, as for example, those indicated at 17, in place within the slots provided in upper frame members **5*a* and 5*b* in similar manner to that of the lower frame assembly as hereinbefore described in detail. An insulated metal floating pressure plate 10 is fastened to the upper frame retainer plate 9 and a second, insulated metal floating pressure plate 11 is similarly fastened to the retainer plate 8 by suitable fasteners at the points 20. Pressure plates 10, 11 are also slotted in their forward edges to provide guides for the electrical contact springs 17 and, in addition, are used to maintain constant pressure on the upper surface of both connector and printed circuit ends of the module board under test through use of the compression springs indicated at 29 as attached therebetween. Moreover, pressure plates 10, 11 are each equipped with a central slot, as at 10*a* and 11*a*, to further accommodate and mesh with the enlarged pin 6*b* mounted on lower frame retainer plate 6. In this connection, should the printed circuit module under test be a half-size board, the bracket 37 on lower frame 4, together with the retainer spring 38 on the upper frame 5, would be utilized to hold the reduced size board in place. Electrical contact springs 17 and 18 may be connected by electrical wire to suitable electrical connectors, not shown, mounted by the metal bracket at 33** in FIGURE 2, positioned on the rear of the fixture.

Captive fasteners at 35 are provided for mounting the module test fixture of the present invention. The fixture is held open at the correct position by the door stops at 23, 24 which are hinged on a special pin at the point 25. The previously noted bottom and top covers 2 and 3 are locked in their closed position by means of the latching mechanism indicated generally at 27 as consisting of a metal bracket 21, a fork element **27*a*, the latch 28, the adapter plate 34 and the shim at 36**.

Figure 2:
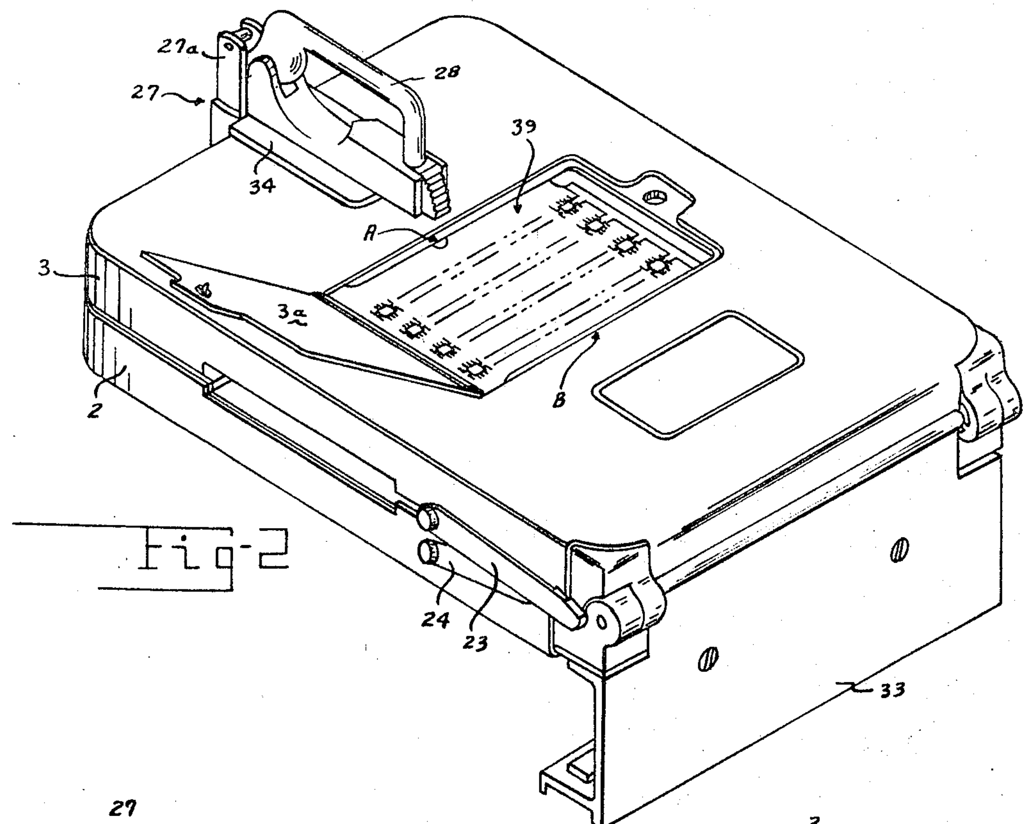
FIGURE 2 is a top perspective view of the present module test fixture, in its closed test position, and illustrating in schematic form a printed circuit module mounted in its test position, as viewed through an inspection door incorporated in the top cover of the inventive fixture.
Figure 3:
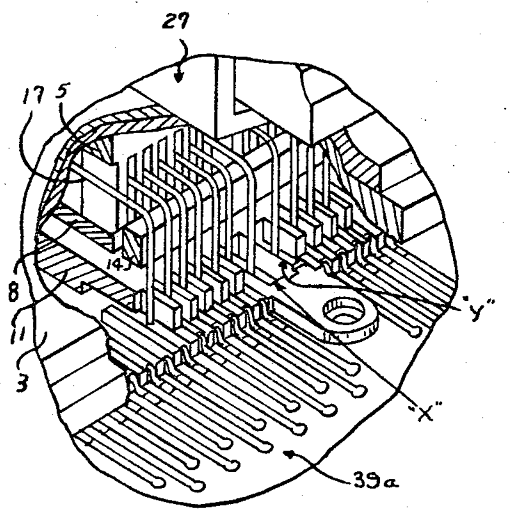
FIGURE 3 is an enlarged, partly sectional and broken-away, top perspective view of the area designated at A in FIGURE 2, illustrating details of the action of the electrical contact springs of the present invention when engaged with the connector end of the module under test, and as viewed in a direction looking away from the main hinge.
Figure 4:
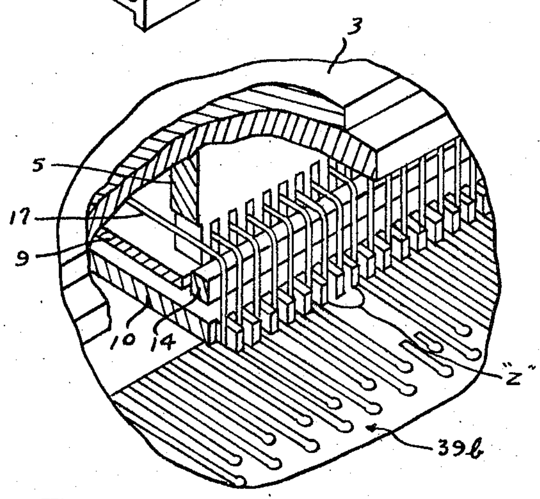
FIGURE 4 is still another enlarged, partly sectional and broken-away, top perspective view of the area designated at B in FIGURE 2, illustrating details of the action of the electrical contact springs of the present invention when engaged with the printed circuit end of the module under test, and looking toward the main hinge.

Referring now to FIGURES 2, 3 and 4 of the drawings, FIGURE 2 illustrates the module test fixture of the present invention with its bottom and top covers 2 and 3 locked in their closed position by the previously described latching mechanism 27. Top cover 3 is shown with its inspection door **3*a* in its open position, and a printed circuit module to be tested is indicated in its test mounted position in schematic form at 39. In FIGURE 3, the operation of the inventive test fixture is shown at the connector end of the printed circuit module under test. Thus, as the fixture is closed, upper frame 5 carries electrical contact springs 17 to a position in contact with the connector end, indicated schematically at 39*a*, of the module under test. In making this contact, electrical contact springs 17, which were previously engaged with shorting bar 14, move in the slots provided in frame 5 relative to said bar and are thereby generally raised or lifted off of the aforesaid shorting bar 14. However, at the point X, the absence of a key permits the corresponding contact spring 17 to drop into the slot resulting therefrom and, in this manner, engage with and, therefore, short-out on the shorting bar 14. On the other hand, at the point Y, the presence of a key lifts or raises corresponding contact spring 17 off the shorting bar 14. As previously described, during this operation, contact springs 17 are guided to their correct positions by means of the slots provided in the insulated metal frame 5 and the insulated metal pressure plate 11**.

In FIGURE 4 of the drawings, the operation of the inventive test fixture is illustrated at the printed circuit module under test. Again, as the fixture is moved to its closed position, electrical contact springs 17 make contact with the printed circuit board at the printed circuit end, indicated schematically at 39*b* and are thereby generally raised off the shorting bar 14. Then, at the point Z at the connector end, where a key slot appears, the corresponding contact spring 17 drops into the slot and thereby moves to an engaged position with, and shorts-out on the shorting bar 14 associated therewith. Slots in the insulated metal frame 5 and the insulated metal pressure plate 10 again guide the contacts 17 to their correct position.

From the above described operation, it becomes evident, therefore, that the present device generally automatically senses all test positions of the selected module under test and, in particular, respectively indicates the module key slots by movement of the corresponding electrical contact spring to an engaged position with, and therefore shorting out on the electrical shortig bar 14. Additionally, connector keys are also automatically sensed by movement of a corresponding contact spring to a raised position out of contact with and, therefre, disposed in non-shorting relation to the shorting bar 14. With the foregoing arrangement, the particular key configuration of the selected module may first be checked and verified by comparing with a selected tape program coupled with a patchboard automatic check-out equipment and the fixture itself. In this manner, functional testing is begun only after key verification has been accomplished, through the improved electro-mechanical sensing system of the present invention. Thus, no damage will likely result to the module due to having either the wrong module, tape, patchboard, or any combination thereof.

We claim:

1. In an improved module test fixture adapted as a common interface between any one of a plurality of printed circuit modules of varying configuration and a common functional test console, module-support means for releasably retaining a selected module incorporating a prearranged key configuration thereon in test position, and separate module-key sensing and testing means positioned on said test module-support means for movement between inoperative, non-test and operative test positions and comprising a plurality of electrically-interconnected module-key sensing and test probe elements adapted for movement to resilient contact with, and electrically sensing the prearranged key configuration of the selected module under test, and sensing and test probe element-control and shorting device means engageable and mounted for simultaneous movement with said plurality of sensing and test probe elements to said inoperative, non-test position and further adapted to effect initial simultaneous movement with said sensing and test probe elements to said operative test position in contact with said selected module to thereby generally electrically sense all prearranged test positions thereon, said sensing and test-probe elements being flexibly mounted to subsequently selectively sense module-printed circuit and connector end key slots and key positions by the selective and relative movement of corresponding sensing and test-probe elements either to an engaged, shorting-out position on, or a disengaged, non-shorting position relative to said control and shorting device means.

2. In an improved module test fixture as in claim 1, wherein said module-support means includes guide pin retainer means adapted to index with the connector end of the selected module under test, and a spring-mounted quick-release guide plate adapted to accommodate the module-printed circuit end and resiliently urge the connector end thereof in registration with said guide pin retainer index means.

3. In an improved module test fixture as in claim 1, said module-support means including a plurality of electrically-interconnected contact means adapted for movement relative thereto between open and closed-circuit positions, shorting bar device means engageable with, and effecting operation of said contact means, and cam-actuator means adjustably positioned for rotation on said module-support means and attached to said shorting bar device means to thereby effect alternate movement of said plurality of contact means between said open and closed-circuit positions.

4. In an improved module test fixture as in claim 3, said cam-actuator means being engageable with, and operated by the action of said module-key sensing and testing means in its movement between inoperative, non-test and operative, test position to thereby open and close a testing circuit to said plurality of sensing and test probe elements.

5. In an improved module test fixture as in claim 1, wherein said module-key sensing and testing means comprises a main mount having slotted intermediate supporting members adapted to position said plurality of sensing and test probe elements therein for limited movement relative thereto between inner, non-operative and outer, operative positions, and sensing and test probe-element retainer means affixed to said main mount and mounted in a position relative to said sensing and test probe elements to restrain said elements to one of two positions within said slotted intermediate supporting members respectively representing either the non-test or test position thereof.

6. In an improved module test fixture as in claim 1, wherein said module-support means comprises a first support frame member having a first plurality of integral intermediate slotted portions, said module-key sensing and testing means includes a second support frame member hingedly mounted to said first support frame member for movement to substantially mating relation with said first support frame member and having a second plurality of integral intermediate slotted portions movable to fixture closed position in nearly adjacent relation to said first plurality of intermediate slotted portions, and said plurality of module-key sensing and test probe elements comprise a first set of electrically-interconnected, contact springs positioned within the intermediate slotted portions of said first frame member in matching electrical contact with a second set of electrically-interconnected contact springs positioned in the intermediate slotted portions of said second frame member to thereby collectively test all positions of the selected module under test.

7. In an improved module test fixture as in claim 6, said first support frame member incorporating at least one pair of cam members each attached thereto by a compression spring and urged to a first, spring-compressed position by movement of said second support frame member to a closed, operative position, said cam members being affixed to opposite ends of said sensing and test probe element-control and shorting device means and said last-named means electrically connecting said first and second set of electrical contact springs when said cam members are in said first, spring-compressed position and automatically effecting withdrawal of said second set of electrical contact springs from electrical contact with said first set of contact springs when said cam members are operated to a second, cam-release position by said compression springs simultaneously with movement of said second frame member to an open, inoperative position.

8. In an improved module test fixture as in claim 7, said first and second frame member each incorporating retainer plate means having slotted edge portions for guiding said electrical contact springs in their movement between withdrawal and electrical contact positions, and each of the retainer plate means incorporated on said second frame member having intermediately-positioned, floating pressure-plate means spring-connected thereto and resiliently urged in mechanical contact with and to assist in retaining the selected module in its test position.

9. In an improved module test fixture as in claim 1, said module-support means comprising a primary frame member having a pair of slotted transverse support portions respectively providing main support adjacent the connector and printed circuit ends of the selected module under test and having a first set of electrical contact springs adjustably positioned in slidable relation therein between inner, open-circuit and outer, closed-circuit positions, a pair of secondary frame members positioned intermediately of said primary frame member and the selected module respectively adjacent the module-connector and printed circuit ends and resiliently supporting the selected module in test position, and cam-operated means positioned on said primary frame member for movement between one or two positions to effect simultaneous movement therewith of said sensing and test probe element-control and shorting device means and the sensing and test probe elements engageable therewith between said inner and outer positions.

10. In an improved module test fixture as in claim 9, wherein said module-key sensing and testing means includes a second, primary frame member adjustably mounted to said first, primary frame member and having a matching pair of slotted transverse support portions having a second set of electrical contact springs adjustably positioned in slidable relation therein for movement between outer, non-test and inner, test positions corresponding to the key and slotted positions electrically sensed on the test module by the respective movement of corresponding electrical contact springs to an engaged position with the module under test.

References Cited

UNITED STATES PATENTS

| | | | |
|---|---|---|---|
| 2,281,958 | 5/1942 | Snavely. | |
| 2,968,019 | 1/1961 | Steinman | 339—151 |

RUDOLPH V. ROLINEC, *Primary Examiner.*

E. L. STOLARUM, *Assistant Examiner.*